(No Model.) 2 Sheets—Sheet 1.

W. H. FRITZ.
TROLLEY WHEEL AND YOKE.

No. 541,044. Patented June 11, 1895.

WITNESSES:
Lester L. Allen
A. J. Fiorini

INVENTOR
Wm. H. Fritz
BY
R. J. McCarty
ATTORNEY.

(No Model.) 2 Sheets—Sheet 2.
W. H. FRITZ.
TROLLEY WHEEL AND YOKE.
No. 541,044. Patented June 11, 1895.
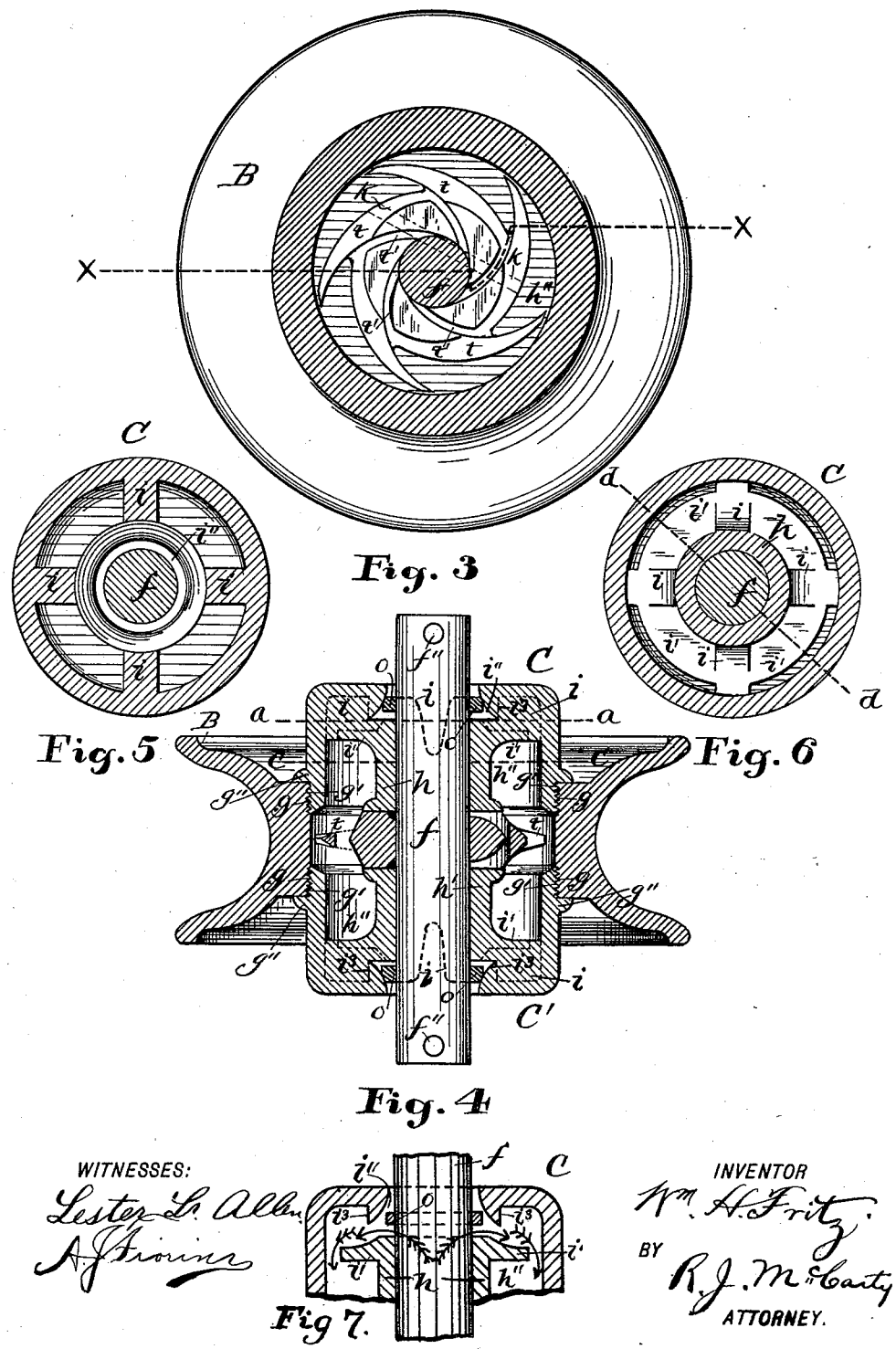
WITNESSES: INVENTOR
Wm. H. Fritz
BY
R. J. McCarty
ATTORNEY.

UNITED STATES PATENT OFFICE.

WILLIAM H. FRITZ, OF DAYTON, OHIO, ASSIGNOR OF TWO-THIRDS TO ORLANDO P. McCABE AND GEORGE R. DECKER, OF SAME PLACE.

TROLLEY WHEEL AND YOKE.

SPECIFICATION forming part of Letters Patent No. 541,014, dated June 11, 1895.

Application filed March 12, 1895. Serial No. 541,506. (No model.)

*To all whom it may concern:*

Be it known that I, WILLIAM H. FRITZ, of Dayton, county of Montgomery, State of Ohio, have invented a new and useful Improvement in Trolley Wheels and Yokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in trolley self-oiling wheels, and trolley yokes, upon which said wheels are supported. Owing to the severe usage the trolley wheel is required to stand, the disposition of the contact surface of the rim to wear out much quicker than other parts of the wheel, is very great, and when the rim is thus worn out the wheel has to be replaced by an entirely new one.

Therefore the object of this invention is to provide a wheel, the hub and rim portions of which are detachable from each other, so that a worn out rim may be removed from the hub and a new rim substituted, and this repeated until the hub itself becomes unserviceable.

A further object of my invention is to provide improved means for lubricating the shaft, over those shown and described in United States Letters Patent granted to me February 19, 1895, for improvements in self oiling pulleys, No. 534,556; and a further object is to provide an improved trolley yoke, that is constructed in one integral piece having the journal openings extending to and through the edges thereof, and having the advantages of cheapness and durability.

To these ends my invention consists of parts that will be fully described in the following specification, and pointed out in the claims.

Figure 1:
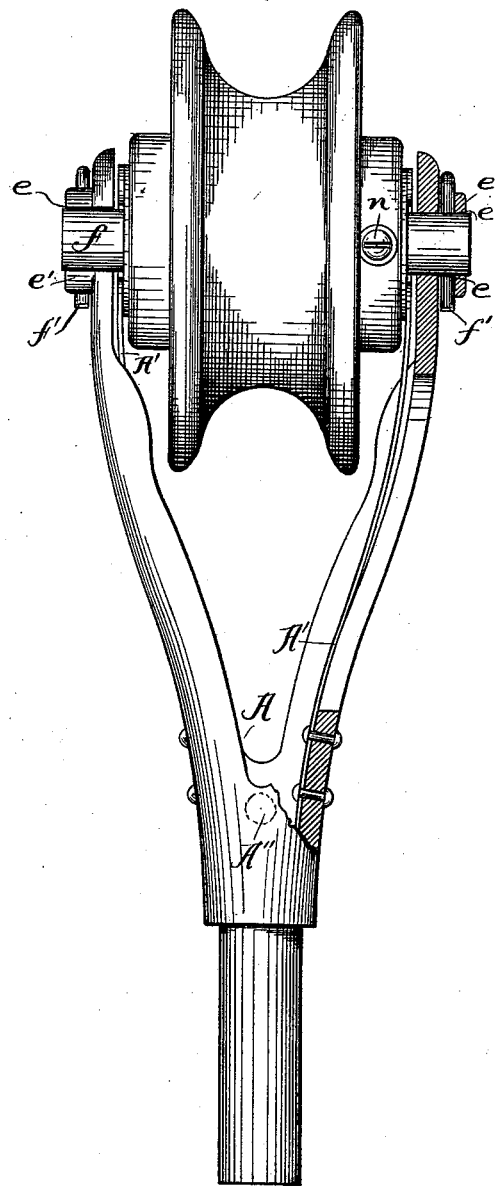
Figure 2:
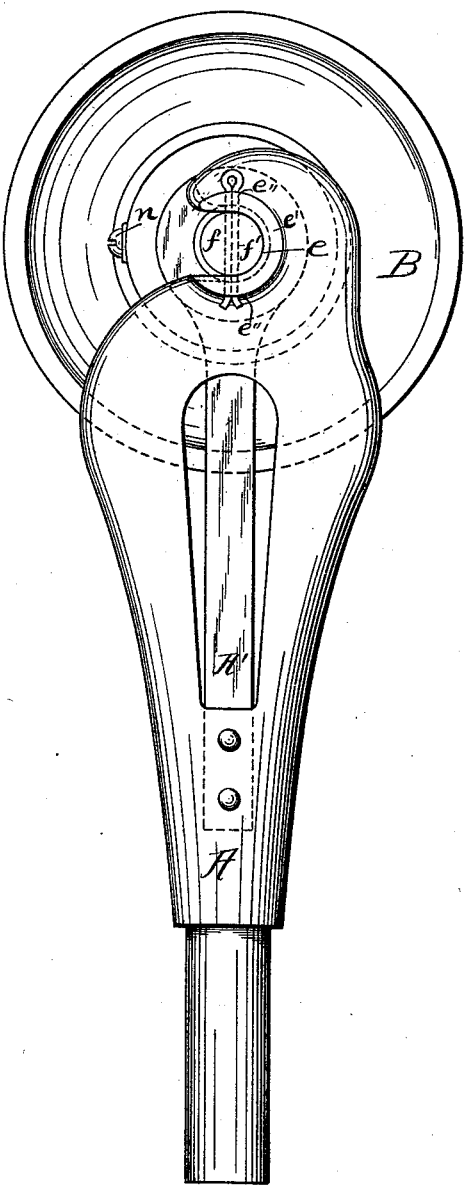

Referring to the annexed drawings, which illustrate my invention, and upon which similar letters of reference indicate corresponding parts, Figure 1 is a vertical front elevation of my improved trolley yoke and wheel; Fig. 2, a vertical side elevation of the same; Fig. 3, a section through the vertical axis of the wheel; Fig. 4, a section on the line $x$ $x$ of Fig. 3; Fig. 5, a section of the hub on the line $a$ $a$ of Fig. 4; Fig. 6, a section on the line $c$ $c$ of Fig. 4; Fig. 7, a section on the line $d$ $d$ of Fig. 6.

Describing in detail the invention, (A) designates the trolley yoke having the usual contact strips (A') riveted to the inner side thereof, and the opening (A'') for a connection with the rope. (Not shown.) This yoke is constructed in one piece, and has journal openings ($e$) that extend through half the diameter of the metal on each side, as is shown in Fig. 2. By constructing the bearing end of the yoke in this manner, the shaft ($f$) of the trolley wheel may be dropped into said openings or removed thereform, quickly and with no difficulty. ($e'$) designates bosses on the sides of the yoke and surrounding the openings ($e$). These bosses afford a desirable bearing for the journals of the shaft ($f$) which are maintained therein by split pins ($f'$) that penetrate openings ($e''$) in said bosses, and ($f''$) in the shaft.

A yoke constructed in accordance with the foregoing description, besides having the advantages of being an integral piece, which obviates the possibility of the parts becoming detached, also affords easy means for mounting or dismounting the trolley wheel.

The rim (B) of the trolley wheel is provided with a circumferential peripheral groove of sufficient space to allow the trolley wire to change its position thereon, thus avoiding an excessive wearing of one part of the rim. The rim is detachable from the hub by means of interior screw threads ($g$) that engage with exterior screw threads ($g'$) and abut with annular flanges ($g''$) on the inner ends of the hub.

The hub is constructed in two sections (C) and (C'). In uniting these parts, each section of said hub is screwed into the rim until the flanges ($g''$) come in contact with the rim as shown in Fig. 4, and a few drops of solder is applied to the joints to seal the parts and prevent their possible separation while in use. The interior of the hub has integral inner bearing portions ($h$) and ($h'$) between which, and the outer part of said hub, an annular oil chamber ($h''$) is formed. The outer ends of each of said inner bearing parts ($h$) and ($h'$)

has integral strengthening ribs (*i*) that also serve to deflect the oil inwardly. These ribs are arranged diametrically opposite each other, and have between and integral therewith an annular splasher (*i'*) that obstructs an endwise passage of the oil from the chamber. The outer extreme ends of the sections (C)—(C') terminate in a funnel shaped opening (*i''*) through which the shaft passes, and an interior annular ledge (*i³*) is formed in said ends which serves to prevent any oil that might possibly escape from the chamber from leaving the ends of the hub. This possibility of escapage is still further provided against by means of washers (*o*)—(*o*) which are preferably constructed of pliable material, such for example, as leather. These washers surround the shaft (*f*) and are maintained in the serviceable position shown in Fig. 3, by the bevel surface (*i''*). The washer in that respective end is removed from Fig. 5.

In Fig. 7, the arrows indicate the direction taken by any oil that might escape along the shaft (*f*) which marks its return to the chamber (*h''*). There is a space provided between the inner ends of the parts (*h*) and (*h'*) that is occupied by an oiler that directs the oil back to the shaft. This oiler consists of a plurality of tangents (*t*) on the sides of which are oil runs (*t'*) that lead directly to the shaft, upon which said oiler is rigidly mounted by a pin (*k*). This feature, to wit, the oiling device, as shown and described in the patent hereinbefore referred to, therefore constitutes no part of the present invention. The oil is fed to the chamber through an opening in the hub that is closed by a screw (*n*). The oiling ring being rigid on the shaft serves also the function of a collar to keep the trolley in a central position with reference to the yoke.

Having fully described the invention, I claim as new—

1. A trolley yoke consisting of a single piece and having journal openings extending through approximately one half of each side from the center to the circumference, bosses on the outer sides of said yoke, and partially surrounding the journal openings, openings in said bosses adapted to receive pins, in combination with a trolley wheel, a shaft for said wheel having openings in its ends and adapted to be mounted in the journal openings in the yoke, and means for securing said shaft therein, substantially as described.

2. In a trolley wheel, the combination of a rim consisting of an integral part provided with interior screw threads, a hub consisting of two parts each of said parts having screw threads on its inner end adapted to engage with the screw threads on the interior of said rim, and flanges adjacent to the inner ends of said hub adapted to abut with the sides of the rim, an oil chamber in said hub, an integral annular splasher (*i'*) adjacent to the outer end of each part of said hub, and oiling devices inclosed in said chamber, substantially as described.

3. In a trolley wheel, the combination with the rim consisting of an integral part and provided with interior screw threads, of a hub consisting of two parts with an intervening space between the inner ends of said parts, each of said parts having an annular flange and screw threads adjacent to its inner end, an integral annular splasher (*i'*) and oil deflectors (*i*) on the interior of said parts, and an oiling ring between the inner ends of said parts, substantially as described.

In testimony whereof I have hereunto set my hand this 6th day of March, 1895.

WILLIAM H. FRITZ.

Witnesses:
O. P. McCabe,
R. J. McCarty.